US009037200B2

(12) United States Patent
Yoon et al.

(10) Patent No.: US 9,037,200 B2
(45) Date of Patent: May 19, 2015

(54) ANTENNA DEVICE FOR WIRELESS COMMUNICATION TERMINAL

(71) Applicants: Samsung Electronics Co., Ltd., Gyeonggi-do (KR); R.F. TECH CO., LTD., Gyeonggi-do (KR)

(72) Inventors: Jun Yoon, Gyeonggi-do (KR); Jong-Un Park, Gyeonggi-do (KR)

(73) Assignees: Samsung Electronics Co., Ltd., Yeongtong-gu, Suwon-si, Gyeonggi-do (KR); R.F. Tech Co., Ltd., Wonsam-myeon, Cheoin-gu, Yongin-si, Gyeonggi-do (KR)

( * ) Notice: Subject to any disclaimer, the term of this patent is extended or adjusted under 35 U.S.C. 154(b) by 76 days.

(21) Appl. No.: 13/847,831

(22) Filed: Mar. 20, 2013

(65) Prior Publication Data

US 2013/0252678 A1 Sep. 26, 2013

(30) Foreign Application Priority Data

Mar. 21, 2012 (KR) ........................ 10-2012-0028547

(51) Int. Cl.

| | |
|---|---|
| ***H04M 1/00*** | (2006.01) |
| ***H01Q 1/50*** | (2006.01) |
| ***H01Q 1/24*** | (2006.01) |
| ***H01Q 1/36*** | (2006.01) |
| ***H01Q 1/38*** | (2006.01) |
| ***H01Q 1/10*** | (2006.01) |
| ***H01Q 5/00*** | (2006.01) |
| ***H01Q 9/30*** | (2006.01) |
| ***H01Q 11/08*** | (2006.01) |

(52) U.S. Cl.
CPC ................. *H01Q 1/50* (2013.01); *H01Q 1/243* (2013.01); *H01Q 1/362* (2013.01); *H01Q 1/38* (2013.01); *H01Q 1/10* (2013.01); *H01Q 5/0058* (2013.01); *H01Q 9/30* (2013.01); *H01Q 11/086* (2013.01)

(58) Field of Classification Search
USPC ........................ 455/575.7; 343/850, 860, 702
See application file for complete search history.

(56) References Cited

U.S. PATENT DOCUMENTS

| | | | | |
|---|---|---|---|---|
| 5,258,772 | A | 11/1993 | Inanaga et al. | |
| 5,999,142 | A * | 12/1999 | Jang | 343/834 |
| 6,417,808 | B1 | 7/2002 | Ide | |
| 8,120,545 | B2 * | 2/2012 | Tang et al. | 343/860 |
| 2010/0214184 | A1 | 8/2010 | Tran et al. | |
| 2010/0245200 | A1 | 9/2010 | Swais et al. | |

FOREIGN PATENT DOCUMENTS

| | | | |
|---|---|---|---|
| EP | 0 429 255 | A2 | 5/1991 |
| EP | 1 734 610 | A1 | 12/2006 |
| EP | 1 848 060 | A2 | 10/2007 |

(Continued)

*Primary Examiner* — David Q Nguyen
(74) *Attorney, Agent, or Firm* — Cha & Reiter, LLC

(57) ABSTRACT

Various embodiments of an antenna device for a wireless terminal are disclosed. The antenna device includes a radiator configured to be extracted from/retracted into the wireless terminal, a L-C lumped circuit, and a noise removing coil coupled between the radiator and the L-C lumped circuit, to attenuate noise introduced through the radiator. The radiator may be configured as a helical coil or at least one meandering printed pattern so as to reduce its overall length while maintaining a desired electrical length. In embodiments, the antenna device is useful for UHF/VHF frequency bands. Multi-band configurations are disclosed. In one embodiment, a stainless steel tube member substantially surrounds a helical coil, and the tube member operates at a lower frequency band than the helical coil.

19 Claims, 9 Drawing Sheets

(56) References Cited

FOREIGN PATENT DOCUMENTS

| | | | |
|---|---|---|---|
| JP | 10-22730 | A | 1/1998 |
| KR | 10-2010-0053735 | A | 5/2010 |
| KR | 10-2011-0083425 | A | 7/2011 |
| KR | 10-2011-0083426 | A | 7/2011 |
| KR | 10-1059447 | B1 | 8/2011 |
| WO | 97/49141 | A1 | 12/1997 |

* cited by examiner

ANTENNA DEVICE FOR WIRELESS COMMUNICATION TERMINAL

CLAIM OF PRIORITY

This application claims the priority under 35 U.S.C. §119 (a) to Korean Application Serial No. 10-2012-0028547, which was filed in the Korean Intellectual Property Office on Mar. 21, 2012, the entire content of which is hereby incorporated by reference.

BACKGROUND

1. Technical Field

The present disclosure relates generally to a wireless communication terminal, and more particularly, to an antenna device of a wireless terminal for transmitting/receiving a wireless signal.

2. Description of the Related Art

A wireless communication terminal ("wireless terminal") is generally any electronic device capable of wirelessly receiving and/or transmitting an information signal or communication signal. Wireless terminals include mobile terminals such as cell phones and smart phones, traditionally used as a medium for simple communication, such as voice communication or short message transmission. Recently, owing to the development of communication technologies, a user may quickly obtain a large variety of information through a wireless terminal In addition, it becomes possible to receive satellite broadcasting or terrestrial broadcasting. Furthermore, for example, a credit card function is incorporated in a wireless terminal The development of electronic communication technologies has made it possible to incorporate, for example, a multimedia function, an entertainment function, a digital organizer function, a banking function, and a security function in a single mobile terminal based on a communication function.

Since a wireless terminal is used while it is hand carried, lightweight and miniaturized designs are preferable. A circuit of, e.g., a processing device that executes various functions may be miniaturized by increasing the integration degree of an integrated circuit chip. However, some elements have a limit in miniaturization. For example, a battery pack is capable of supplying power for a predetermined length of time which is in proportion to the volume and capacitance of the battery pack. In addition, at today's cell phone frequency bands, it is practically impossible to physically incorporate antenna devices in a single module or chip. Therefore, in relation to the elements such as the battery pack and the antenna pack of which the sizes are difficult to physically reduce, efforts are continually made to reduce the size of a terminal by optimizing the arrangement of the elements inside the terminal.

Meanwhile, as described above, as the functions of wireless terminals have diversified, the number of antenna devices within a terminal has also increased. Early terminals were only equipped with an antenna required for a mobile communication function. However, three or four types of antennas are now commonly provided within a single terminal, including an antenna for short-range wireless communication, such as wireless LAN and Blue-tooth, and a broadcasting receiving antenna.

Because the mobile communication or short-range wireless communication usually uses frequencies in a band of several GHz, an antenna device having a relatively short electric length is used. Therefore, an antenna for these applications is easy to physically miniaturize and thus, is suitable to be accommodated in a terminal. In contrast, an antenna device for a frequency band of tens to hundreds of MHz (VHF) or a band of several hundred MHz (UHF) like terrestrial broadcasting has a considerable electric and physical length and thus, has a limit to be accommodated inside a small wireless terminal. Therefore, a broadcasting antenna provided in a wireless terminal is generally provided in a removable structure based on an earphone cable or whip antenna structure, or is accommodated in the terminal in a multi-stage whip antenna structure.

A removable antenna is mounted on a terminal during use of the terminal. Therefore, the removable antenna is advantageous in miniaturizing and lightening the terminal However, a disadvantage is the need to separately carry the broadcasting antenna when it is removed. Accommodating a whip antenna of a multi-stage structure in a terminal is advantageous in that the terminal is easy to carry although it is somewhat unsuitable for miniaturizing and lightening the terminal However, an antenna of a frequency band of tens to hundreds of MHz usually has a length of at least about 20 cm and up to about 40 cm when it is fully drawn out from the terminal and thus, the antenna is disadvantageously inconvenient to use while the user is moving during practical use.

SUMMARY

Accordingly, an aspect of the present disclosure is to provide an antenna device for a wireless terminal rendering it easy to carry, and which is miniaturized so that the terminal is convenient to use in a state where the antenna is drawn out from the terminal.

Another aspect is to provide an antenna device for a wireless terminal in which the antenna device has a broadband characteristic according to a structure of a radiator thereof.

Various embodiments of an antenna device for a wireless terminal are disclosed herein. The antenna device includes a radiator configured to be extracted from/retracted into the wireless terminal, a L-C lumped circuit, and a noise removing coil coupled between the radiator and the L-C lumped circuit, to attenuate noise introduced through the radiator.

The radiator may be configured as a helical coil or at least one meandering printed pattern so as to reduce its overall length while maintaining a desired electrical length.

In embodiments, the antenna device is useful for UHF/VHF frequency bands.

Multi-band configurations are disclosed. In one embodiment, a conductive (e.g. stainless steel) tube member substantially surrounds the radiator embodied as a helical coil. The tube member operates at a lower frequency band than that of the helical coil.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EXEMPLARY EMBODIMENTS

Hereinafter, various embodiments of the present disclosure will be described with reference to the accompanying drawings. In the following description, a detailed description of known functions and configurations incorporated herein will be omitted to avoid obscuring the inventive subject matter of the present disclosure.

As used in this document, including the Claims section, the words "a" or "an" mean one or more than one. The term "plurality" means two or more than two. The term "another" is defined as a second or more. The words "comprising", "including", "having" and the like are open ended. Reference herein to "one embodiment", "embodiments", "an embodiment", "first embodiment" or similar term means that a particular feature, structure, or characteristic described in connection with the embodiment is included in at least one embodiment. The appearances of such phrases in various places throughout this disclosure are not necessarily all referring to the same embodiment. Furthermore, the particular features, structures, or characteristics may be combined in any suitable manner on one or more embodiments without limitation. The terms "may" or "can" are used herein to refer to at least an optional element, feature, function, characteristic, advantage, etc., of a described embodiment. Terms such as "substantially" or "generally" signify equality or an approximation with respect to a parameter.

Figure 1:
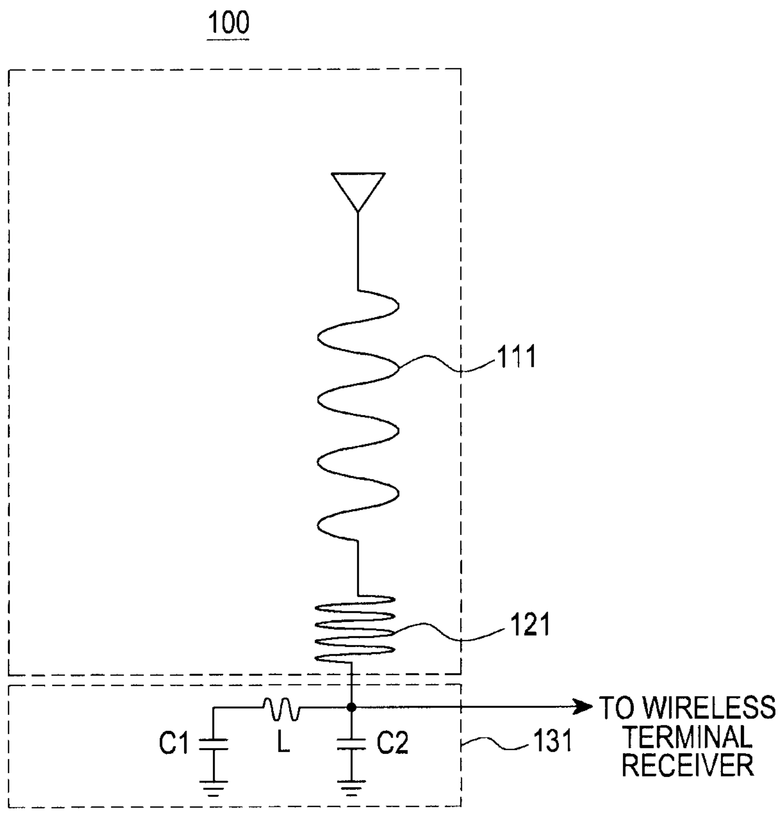
FIG. 1 is a schematic view illustrating a configuration of an antenna device according to a first exemplary embodiment.

As illustrated in FIG. 1, an antenna device 100 for a wireless communication terminal 10 according to a first exemplary embodiment includes a radiator 111, a noise removing coil 121, and an inductance-capacitance lumped circuit ("L-C lumped circuit") 131, in which the noise removing coil 121 is coupled to the L-C lumped circuit 131 to attenuate noise introduced through the radiator 111.

The radiator 111 performs practical reception/transmission of radio wave signals, and may be configured by, for example, a helical coil or a radiating pattern formed by printing a conductive material in a predetermined meandering pattern. Configuring the radiator 111 in a helical pattern allows the extended length of the radiator to be made shorter while achieving a desired electrical length. The noise removing coil 121 serves to remove noise introduced through the radiator 111 and is serially connected with the radiator 111. Thus radiator 111 is coupled to the L-C lumped circuit 131 through the noise removing coil 121. The L-C lumped circuit 131 is configured by combining a capacitive element (capacitors C1 and C2) and an inductive element L, and forms a low pass filter or a band pass filter by being coupled with the noise removing coil 121. Configurations other than the illustrated C1-L-C2 configuration are alternatively available for L-C lumped circuit 131.

Figure 2:
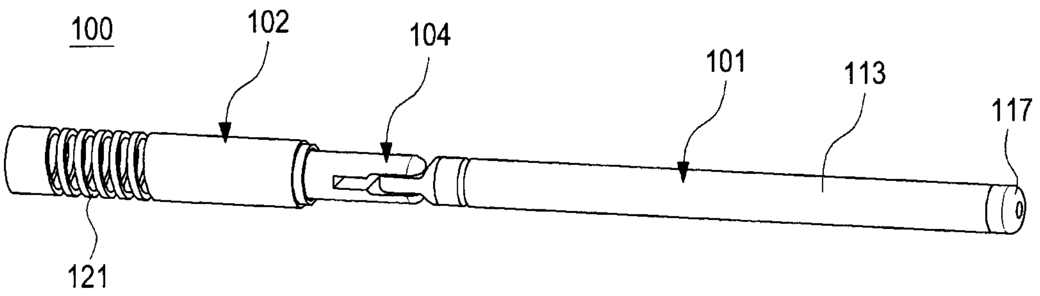
FIG. 2 is a perspective view illustrating an example of implementing the antenna device illustrated in FIG. 1.
Figure 3:
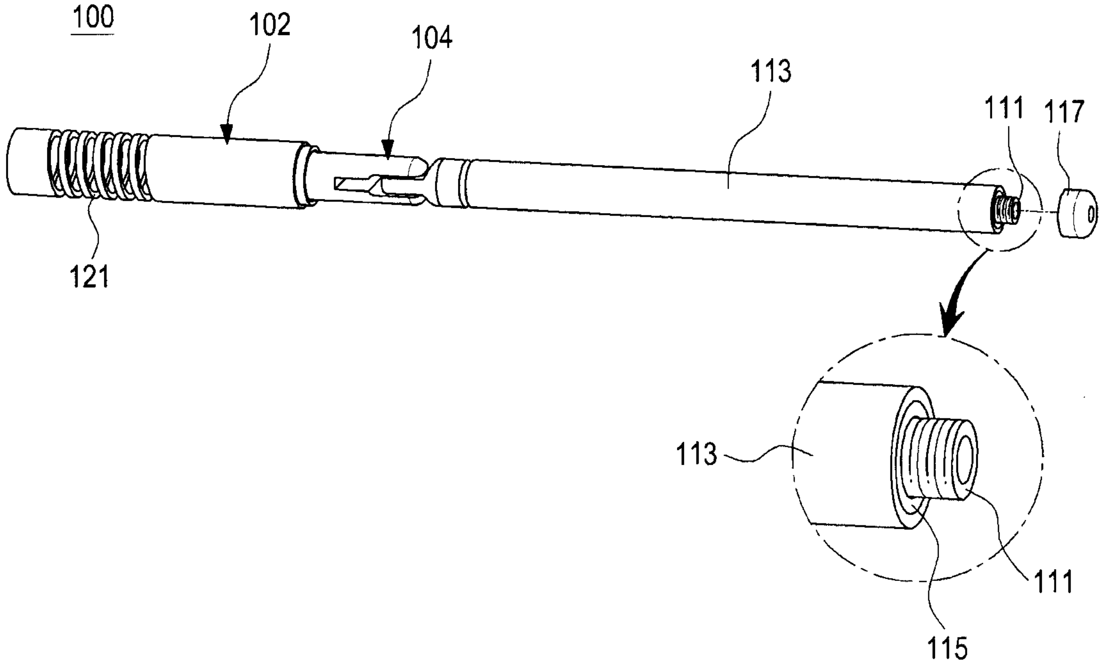
FIG. 3 is an exploded perspective view illustrating the antenna device illustrated in FIG. 2 in a state where a cap is separated from the antenna device.
Figure 4:
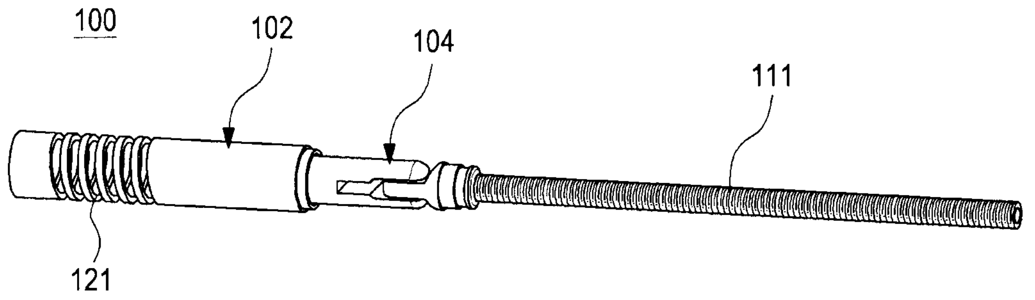
FIG. 4 is a perspective view illustrating the antenna device illustrated in FIG. 2 in a state where the cap and a tube member are removed from the antenna device.
Figure 5:
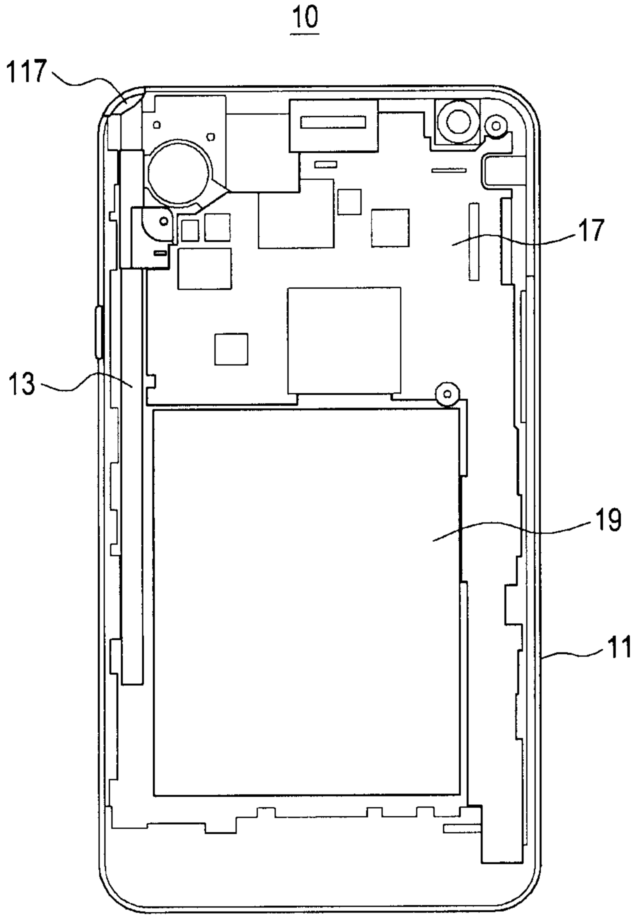
FIG. 5 is a top plan view illustrating internal components layout of a wireless communication terminal which is equipped with the antenna device illustrated in FIG. 1.

FIGS. 2 to 4 illustrate an example of practically implementing the antenna device 100 illustrated in FIG. 1 for a wireless terminal. FIG. 5 illustrates a wireless terminal 10 that may include antenna device 100 (and other antenna device embodiments described later). The antenna device 100 has a rod antenna shape in external appearance in which a bushing 102 and a radiating unit 101 are coupled to each other through a hinge member 104. As illustrated in FIG. 5, a wireless terminal 10 includes a guide tube 13, and the antenna device 100 is provided capable of being drawn out from the guide tube 13 in a state where it is retracted into the terminal 10. The terminal 10 accommodates a main circuit board 17, a battery pack 19, and the antenna device 100 in a housing 11, and is provided with the guide tube 13 configured to guide the extracted/retracted movement of the antenna device 100.

The L-C lumped circuit 131 is disposed inside the terminal 10, e.g., on the main circuit board 17. The user may draw out (i.e., extract) the antenna device 100 as desired. In the state where the antenna device is drawn out from the housing 11, the noise removing coil 121 and the radiator 111 are connected with the L-C lumped circuit 131. That is, the antenna device 100 practically operates in the state where it is extracted from the terminal 10.

It is exemplified that the radiator 111 is configured by winding a helical coil. As the radiator 111 is formed in the helical coil shape, a sufficient electric length may be secured while keeping the length in shape short. For instance, although a broadcasting service provided in a frequency band of tens to hundreds of MHz requires a radiator having an electrical length of 20 cm to 40 cm for optimized antenna performance, the linear length from base to tip may be reduced to about 5 cm to 25 cm while securing the electric length of 20-40 cm when the radiator 111 is implemented in the helical coil shape.

Because the radiator 111 and the bushing 102 are hinged to each other, the user may freely adjust the position of the radiator 111 in the state where the radiator 111 is drawn out. The bushing 102 is disposed inside the terminal 10 to be linearly movable, and even when the radiator 111 is fully drawn out, the bushing 102 is positioned inside the terminal 10. The bushing 102 has an external appearance of a cylinder, and may be freely rotated within the inside of the terminal 10. Accordingly, the radiator 111 may be positioned to be inclined freely at a predetermined range of angles in relation to the retracting/extracting direction in the state where the radiator 111 is fully extracted from the terminal 10. Further, because the bushing 102 is rotatable within the terminal 10, the radiator 111 may be rotated around the bushing 102.

A radiating unit 101 may be provided with a tube member 113 configured to enclose (substantially surround) the radiator 111. The tube member 113 may be composed of a non-conductive material in this embodiment, e.g., rubber or plastic, and does not act as a radiator. Alternatively, tube member 113 can be a conductive material in this embodiment, as long as a separation cap 117 is non-conductive, and as long as tube member 113 is electrically isolated from radiator 111 and is also isolated from components at the base of radiator 111, such as noise removing coil 121. If tube member 113 is conductive, an insulation tube 115 between the radiator 111 and the tube member 113 as illustrated in FIG. 3 is preferably provided so as to prevent the radiator 111 and the tube member 113 from being short-circuited. (In other embodiments discussed later, tube member 113 is a separate radiator.)

As the tube member 113 is provided to enclose the radiator 111, the bushing 102 is pivotally hinged to an end of the tube member 113 due to the external shape thereof In other embodiments, if the radiator 111 is configured in a shape other than the helical coil shape, the tube member 113 can be omitted. That is, the helical coil itself can be formed by winding a conducting wire and when the helical coil is exposed to the outside, the coil may be damaged or the shape of the coil may be changed. Accordingly, it is desirable to protect the helical coil with the tube member 113. However, when the radiator 111 is not a helical coil but e.g. a radiator pattern formed by printing a conductive material, another type of protection means may be provided.

In addition, the separate cap 117 may be coupled to an end of the radiating unit 101. The cap 117 may be handled by the user when the antenna device 100 is drawn out, and the cap 117 may be formed in various shapes. That is, although the cap 117 is illustrated in a cylindrical shape in FIGS. 2 and 3, the shape of the cap 117 may be modified to conform to the shape of the housing 11 of terminal 10, and thereby form a part of the housing 11 when the antenna is retracted as illustrated in FIG. 5.

The noise removing coil 121 can be disposed on any one of the main circuit board 17, the bushing 102, and the radiating unit 101. In any of these locations, noise removing coil 121 can also be disposed together with the L-C lumped circuit 131. When disposed on the radiating unit 101, the noise removing coil 121 is positioned between the radiator 111 and the hinge member 104. Noise removing coil 121 may be formed by winding a conducting wire.

In FIGS. 2 to 4, a configuration in which the noise removing coil 121 is disposed on the bushing 102 is exemplified. Because the bushing 102 has a cylinder shape, the noise removing coil 121 may be formed by cutting out a part of the bushing 102 in such a manner that a portion of the bushing 102 has a coil shape. When a part of the bushing 102 is cut, it is desirable to cut out the central area of the bushing 102 to form the noise removing coil 121 as illustrated in FIGS. 2 and 3 so as to prevent the structural stability of the bushing 102 from being degraded.

In an alternative implementation, the noise removing coil 121 may be formed in the bushing 102 without practically cutting out the bushing 102. For example, the noise removing coil 121 may be formed by winding a separate conducting wire and inserting the wound conducting wire into the bushing 102 or fabricating a part of the bushing 102 in a straight line shape and then processing the noise removing coil as a separate part.

Figure 6:
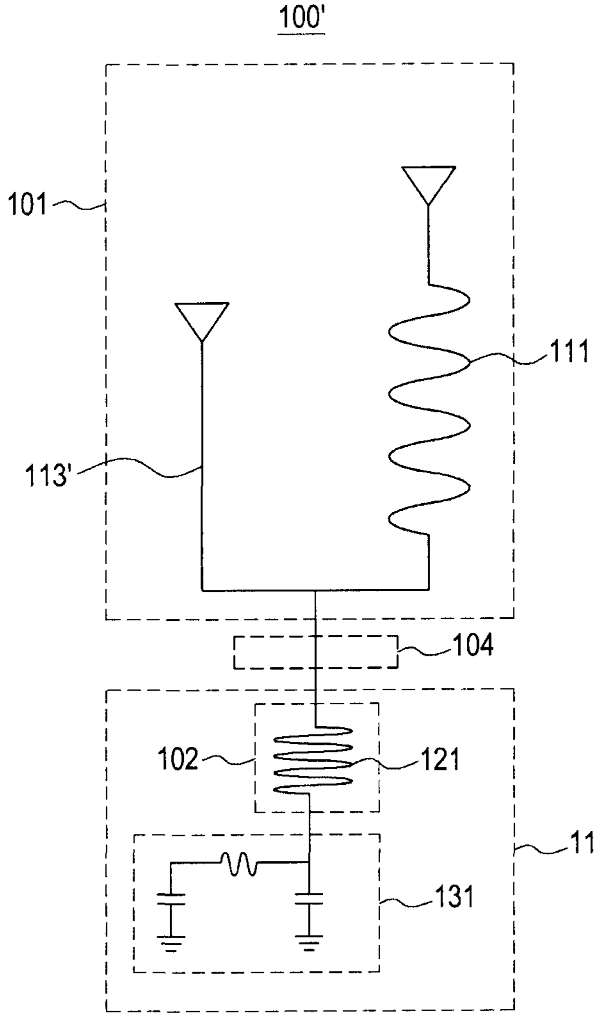
FIG. 6 is a schematic view illustrating a configuration of an antenna device according to a second exemplary embodiment of the present invention.

FIG. 6 is a schematic view illustrating a construction of an antenna device 100' according to a second exemplary embodiment of the present invention. Antenna device 100' differs from antenna device 100 described above in that a tube member 113' replaces tube member 113 of the previous embodiment, where tube member 113' is formed as a second radiator so that the antenna device 100' operates as a dual band or broad band antenna. At the node between the noise removing coil 102 and radiator 111, the tube radiator 113' is electrically connected, i.e., both antennas 111 and 113' are branched from a node at the output of the coil 102 (where the input of coil 102 is considered electrically connected to L-C lumped circuit 131).

The tube member 113' is fabricated from a non-corrosive conductive material, e.g. stainless steel ("SS") material. Accordingly, in order to ensure that the radiator 111 operates stably, it is desirable that the end of the radiator 111 at least partially protrudes from the tube member 113' as illustrated in FIG. 3.

That is, when the radiator 111 is completely accommodated in the tube member 113' of the SS material, the tube member 113' becomes a barrier to the operation of the radiator 111. The portion of the radiator 111 protruding from the end of the tube member 113' is enclosed and protected by the cap 117. The cap 117 is composed of a non-conductive material e.g. rubber or plastic, such that end-fire radiation can still be achieved from the radiator 111. In other implementations, an input section of tube member 113' closer to the terminal housing 11 is composed of SS material, and an output section that interfaces with cap 117 is composed of non-conductive material, in order to modify performance of radiator 111 enclosed within tube 113' as desired.

In addition, because both the radiator 111 and the tube member 113' serve to receive/transmit radio wave signals, the insulation tube 115 is preferably arranged between the radiator 111 and the tube member 113' in the same configuration as illustrated in FIG. 3 (mentioned earlier in connection with tube member 113) so as to prevent the radiator 111 and the tube member 113' from being short-circuited.

As described above, the electric length of the radiator 111 is set to be considerably longer than the linear length (overall length) because the radiator 111 is formed by a helical coil. In contrast, the tube member 113' has a linear length that substantially corresponds to the electric length. Accordingly, the radiator 111 will be optimized for operation (e.g., resonates) in a frequency band lower than that for which the tube member 113' is optimized. For example, when the antenna device 100 is used as a broadcasting antenna, it is desirable that the radiator 111 is set to operate in the VHF band and the second radiator formed by the tube member 113' is set to operate in the UHF band.

Figure 7:
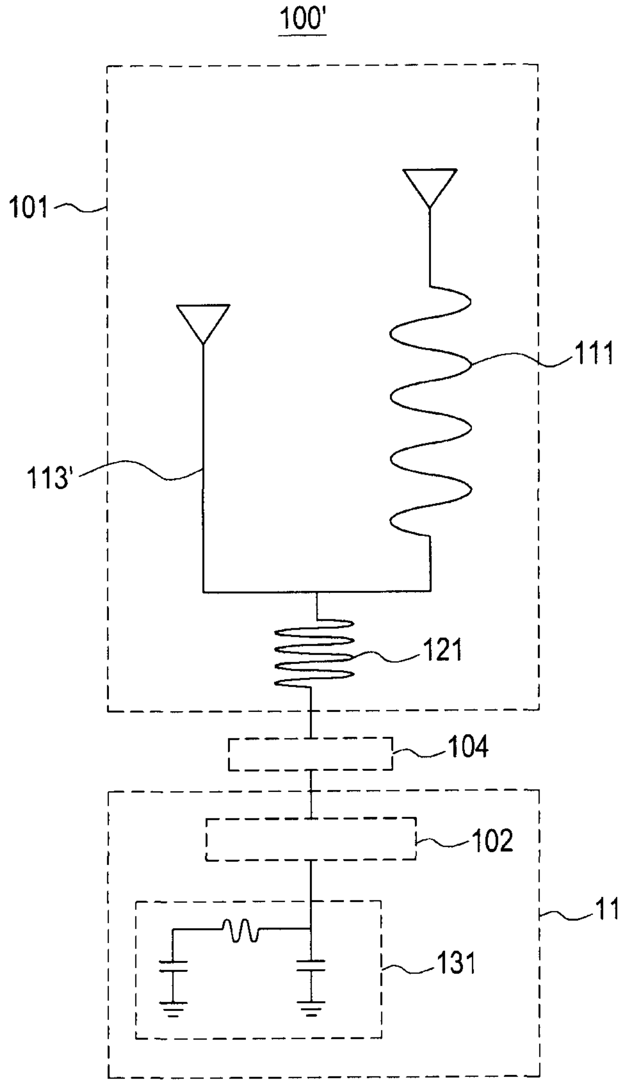
FIG. 7 is a schematic view illustrating a modified example of the antenna device illustrated in FIG. 6.

FIG. 7 illustrates a modified example of the antenna device 100' illustrated in FIG. 6, in which the noise removing coil 121 is implemented in the radiating unit 101. Since the operational and configuration aspects have been described through the preceding exemplary embodiments, the detailed descriptions thereof will be omitted.

Figure 8:
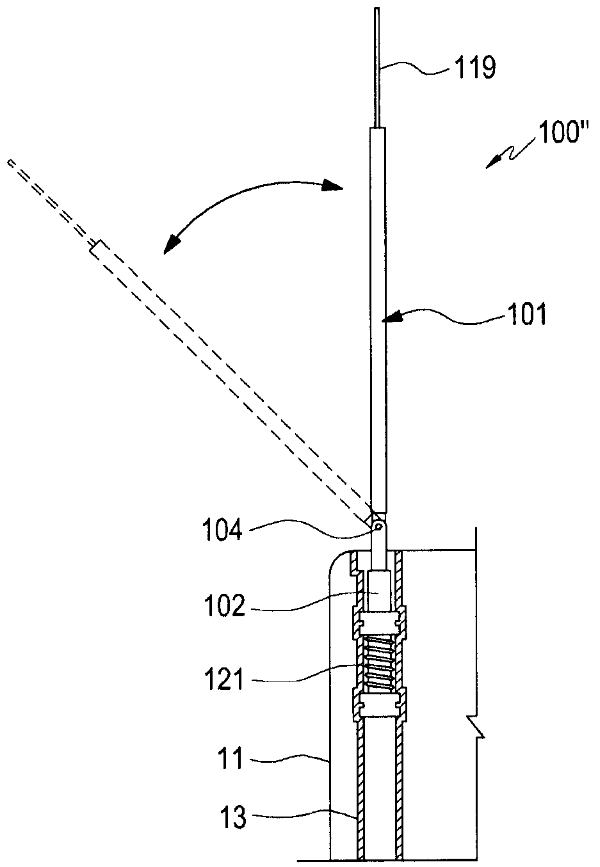
FIG. 8 is a side view illustrating a configuration of an antenna device according to a third exemplary embodiment of the present invention.

FIG. 8 is a schematic view illustrating an antenna device 100" according to a third exemplary embodiment of the present invention, in which the antenna device 100 illustrated in FIGS. 2 and 3 or the antenna device 100' illustrated in FIG. 6 is further provided with a rod antenna member 119. The rod antenna member 119 is installed to be extracted from/retracted into the radiator 111, more specifically, the helical coil (when radiator 111 is embodied as such). As a result, the practical electric length of the radiator 111 may be further increased. That is, when the rod antenna member 119 is fully extracted, its base portion is electrically connected to the end portion of the helical coil radiator 111. In this manner, the radiator 111 and the rod member 119 operate as respective first and second portions of a combined radiator. Electrical connection between radiator 111 and rod member 119 can be made, e.g., via a sliding spring contact, of which suitable designs will be known to those skilled in the art. In addition, when the tube member 113 is formed from the SS material, it is possible to secure a stable radiation structure by drawing out the rod antenna member 119 from the radiator 111 even if the radiator 111 does not protrude from the tube member 113.

Figure 9:
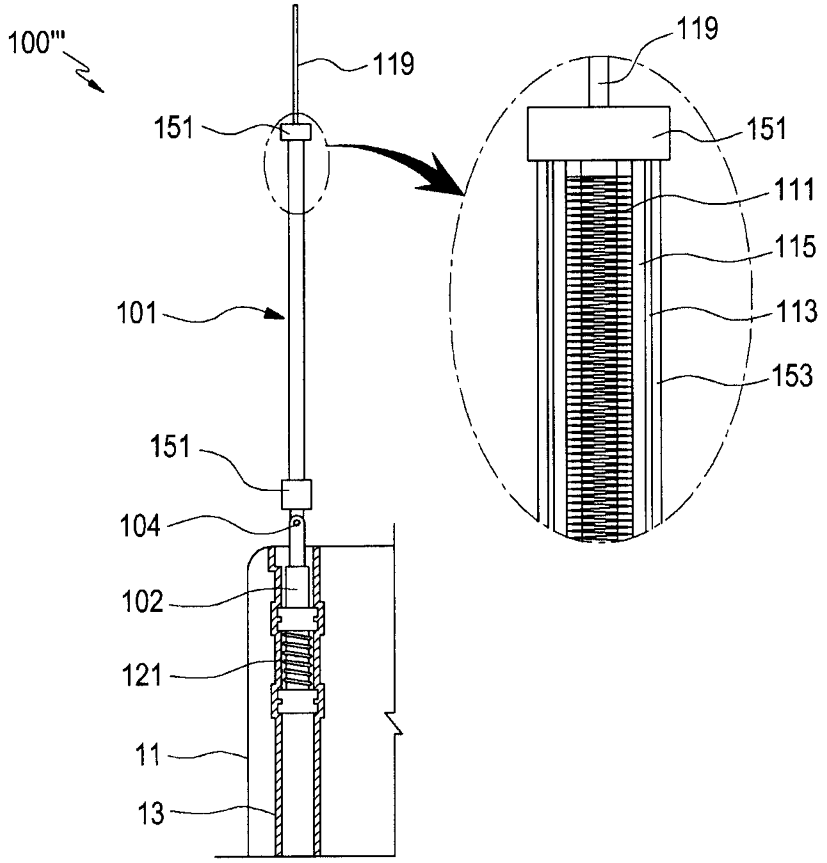
FIG. 9 is a side view illustrating a configuration of an antenna device according to a fourth exemplary embodiment of the present invention.

FIG. 9 is a schematic view illustrating an antenna device 100"' according to a fourth exemplary embodiment of the present invention, in which a coating layer 153 is formed on the outer circumferential surface of the tube member 113 in the configuration of the antenna device 100" illustrated in FIG. 8. Now, additional radiator can be provided on the outer circumferential surface of tube member 113 by a radiator pattern formed by printing a conductive material, and in this case, the coating layer 153 will protect the radiator pattern. In addition, when the radiator pattern is printed on the outer circumferential surface of the tube member 113 as the radiator, the tube member 113 should be formed from an insulation material, such as a synthetic material. When the color of the coating layer 153 is the same as that of the external appearance of the terminal 10, the color of the coating layer 153 may be harmonized with the color of the external appearance of the terminal 10 even in a state where the antenna device 100 is drawn out.

Meanwhile, when the radiator pattern or the coating layer 153 is formed on the outer circumferential surface of the tube member 113, the radiator pattern or the coating layer 153 may be damaged by the extracting/retracting action of the radiating unit 101. In order to prevent this, the antenna device 100' may be preferably further provided with a guide member 151. The guide member 151 is coupled to enclose the outer circumferential surface of the tube member 113 at opposite ends of the radiating unit 101. More specifically, guide member 151 has first and second portions at opposite ends of the tube member 113. Now, the guide member 151 is fabricated to have a diameter larger than that of tube member 113. When the radiating unit 101 is extracted from/retracted into the housing 11 of the terminal 10, the guide member 151 is in sliding contact with a surface inside the guide tube 13 inside of the terminal 10. Because of this guide member's contact within guide tube 13, the tube member 113 with the smaller diameter is not contacted with any other part when it is extracted/retracted. Accordingly, the coating layer 153 and hence the radiator pattern printed on the outer circumferential surface of the tube member 113 may be prevented from being damaged.

Figure 10:
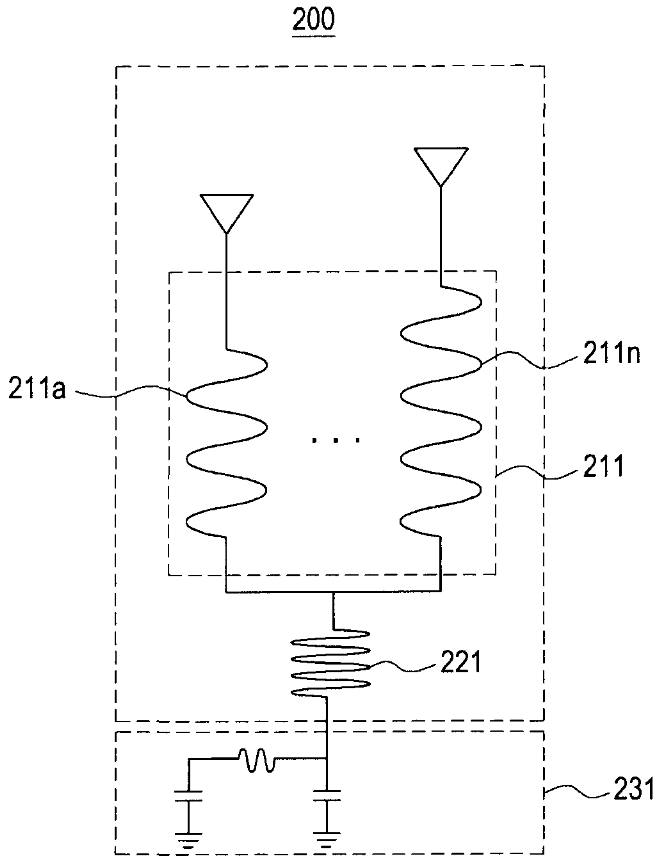
FIG. 10 is a side view illustrating a configuration of an antenna device according to a fifth exemplary embodiment of the present invention.

FIG. 10 is a schematic view illustrating a configuration of an antenna device 200 according to a fifth exemplary embodiment of the present invention, in which a radiator 211 formed from a plurality n of radiator patterns 211*a* to 211*n* is configured to operate in multiple bands. In this case, the noise removing coil 221 and the L-C lumped circuit 231 may be formed in the same construction. However, the diameter and number of windings of the noise removing coil 221 and the specifications of the components of the L-C lumped circuit 231 may be changed according to the operating frequency bands of the antenna device 200. Each of the radiator patterns 211*a* to 211*n* is electrically connected to a common node at the output of noise removing coil 221. That is, the radiator patterns 211*a* to 211*n* branch out as separate radiators from the output of noise removing coil 221.

Figure 11:
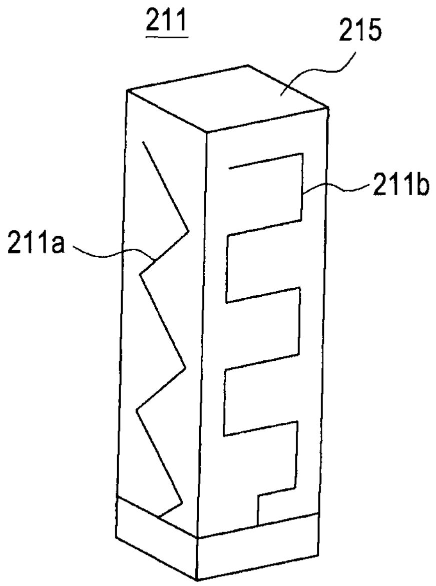
FIGS. 11 and 12 are perspective views illustrating examples of implementing a radiator of the antenna device illustrated in FIG. 10, respectively.
Figure 12:
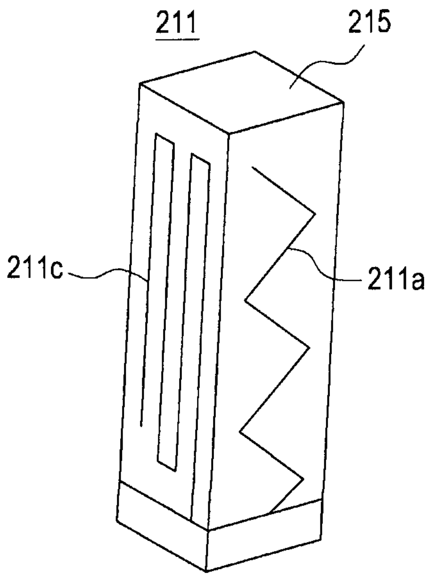
Figure 13:
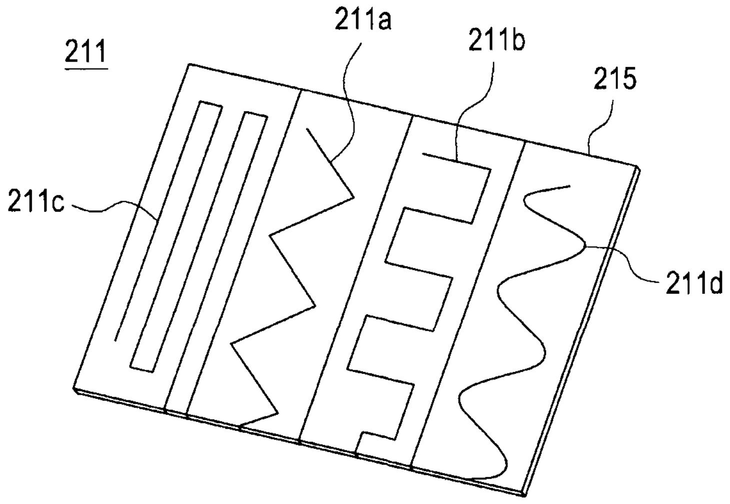
FIG. 13 is a planar figure of the radiator illustrated in FIG. 11.

FIGS. 11 and 12 are perspective views illustrating respective examples of implementing the radiator 211 of the antenna device 200 illustrated in FIG. 10. FIG. 13 is a planar figure illustrating the radiator of FIG. 11 in a planar state prior to its final assembled state. As illustrated in FIGS. 11 to 13, the radiator 211 operating in multiple bands includes a substrate 215 and radiator patterns 211*a*, 211*b*, 211*c*, and 211*d* formed on the outer circumferential surface of the substrate 215. Now, the radiator patterns 211*a*, 211*b*, 211*c* and 211*d* are set to operate in different frequency bands, respectively. In addition, two or three of the radiator patterns 211*a*, 211*b*, 211*c* and 211*d* may interfere with each other to operate in a frequency band that is different from the frequency band at the time when they operate independently from each other. In other words, two or three of the radiator patterns may be operated together as elements of an array optimized in a different frequency band than those at which they operate independently.

The substrate 215 is formed to have a circular, elliptical or polygonal transverse cross-section and to extend along the direction in which the substrate 215 is extracted from/retracted into the wireless communication terminal, and the radiator patterns 211*a*, 211*b*, 211*c*, and 211*d* are individually formed on the outer circumferential surface of the substrate 215 to be independent from each other. When the substrate 215 has a polyhedral structure, of which the cross-section is a polygonal transverse cross-section, one radiator pattern may be formed on each face of the substrate 215. Each of the radiator patterns 211*a*, 211*b*, 211*c*, and 211*d* is serially connected to the noise removing circuit 221 and operates via electrical coupling to a receiver/transmitting unit within wireless terminal 10.

An antenna device configured in any of the ways described above is installed in a wireless communication terminal in a manner capable of being extracted from/retracted into the wireless communication terminal Thereby, it exhibits advantages of enabling a user to draw out and use the antenna device with the wireless terminal as desired, and the antenna device is easy to carry and convenient to use. Furthermore, when the noise removing coil is applied, the antenna performance is stabilized so that the antenna device is easy to miniaturize. When the radiator is configured by a helical coil, the antenna device may be reduced to have a length of about 5 cm to about 25 cm to receive signals at today's commercially available frequencies while having a whip antenna shape. In addition, when the radiator is configured by a helical coil, there is an advantage in that the external color of the terminal and the external color of the antenna device may be harmonized by forming the antenna in a signal stage structure with the same color paint as on the terminal on the outer circumferential surface of the radiator. Moreover, yet another advantage is that the tube member can be configured capable of enclosing the radiator and capable of being used as an additional radiator; therefore, it is possible to configure a multi-band/broadband antenna device.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. An antenna device for a wireless terminal, the antenna device comprising:

a radiator configured to be extracted from/retracted into the wireless terminal;

an L-C lumped circuit; and a noise removing coil coupled between the radiator and the L-C lumped circuit, the noise removing coil and the lumped L-C circuit together forming a low pass or band pass filter to attenuate noise introduced through the radiator.

2. The antenna device of claim 1, further comprising:

a tube member substantially surrounding the radiator, wherein the tube member is extracted from/retracted into the wireless terminal together with the radiator.

3. The antenna device of claim 2, further comprising:

a bushing hinged to an end of the tube member to pivot in relation to the tube member, and configured to linearly move in the interior of the wireless terminal, wherein the noise removing coil is disposed in any one of the tube member and the bushing.

4. The antenna device of claim 3, wherein the bushing has a cylinder shape, and the noise removing coil is a helical coil formed by partially cutting out the bushing so that in an axial direction of the antenna device, the bushing has a proximal portion with a continuous exterior surface, a central portion comprising the helical coil, and a distal portion with a continuous exterior surface, and the helical coil has a diameter substantially equal to a diameter of each of the bushing's proximal and distal portions.

5. The antenna device of claim 4, wherein the radiator is a second helical coil disposed within the tube member, and the antenna device further comprising:

a cap coupled to end of the tube member, wherein the cap encloses an end of the second helical coil.

6. The antenna device of claim 2, wherein the radiator includes a helical coil substantially surrounded by the tube member, and a rod antenna member configured to be extracted from/retracted into the helical coil, wherein the rod antenna member protrudes from an end of the tube member in the state in which the rod antenna member is extracted from the helical coil, the rod antenna member electrically connected to the helical member so as to operate as an extended radiator of the radiator.

7. The antenna device of claim 2, wherein the radiator is a helical coil, and an end of the helical coil protrudes from an end of the tube member.

8. The antenna device of claim 1, further comprising:

a tube member extending in the direction in which the radiator is extracted /retracted, wherein the radiator is a radiator pattern printed on an outer circumferential surface of the tube member.

9. The antenna device of claim 8, further comprising:

a coating layer formed on the outer circumferential surface of the tube member to protect the radiator pattern.

10. The antenna device of claim 8, further comprising:

a guide member provided to enclose the outer circumferential surface of the tube member at the opposite ends of the tube member, wherein the guide member is in sliding contact in the inside of the wireless terminal.

11. The antenna device of claim 1, wherein the L-C lumped circuit is provided in the wireless terminal.

12. The antenna device of claim 1, wherein the radiator is a helical coil optimized for radiation at a VHF frequency band, and the antenna device further comprising a conductive tube member surrounding a portion of the helical coil and operating as a second radiator at a lower frequency band;

wherein the helical coil and tube member are each electrically connected to a node at an output side of the noise removing coil, and an input side of the noise removing coil is electrically connected to the L-C lumped circuit.

13. The antenna device of claim 1, wherein the L-C lumped circuit comprises a first capacitor connected between an input node of the coil and ground potential, and a second capacitor in series with an inductor connected between the input node of the coil and ground potential.

14. The antenna device of claim 1, wherein:

when the antenna device is fully extracted, the antenna device has a proximal end within the wireless terminal, at which the noise removing coil is disposed, and a distal end at which a helical coil is disposed, the helical coil forming at least part of the radiator.

15. An antenna device for a wireless terminal, the antenna device comprising:

a first radiator;

a tube member substantially surrounding at least a portion of the radiator, wherein the tube member is extracted from/retracted into the wireless terminal together with the radiator;

an L-C circuit; and a noise removing coil coupled between the radiator and the L-C circuit, to attenuate noise introduced through the radiator;

wherein the tube member is a second radiator that is formed from a conductive material and connected to an output side of the noise removing coil, and optimized in a frequency band different from a frequency band for which the first radiator is optimized.

16. The antenna device of claim 15, wherein the L-C circuit is a lumped L-C circuit, and the antenna device further comprising an insulation tube within the tube member, the insulation tube surrounding the first radiator.

17. An antenna device for a wireless terminal, the antenna device comprising:

a radiator including a substrate having a polygonal transverse cross-section, the substrate extending in a direction in which the substrate is extracted from/retracted into the wireless terminal, and at least one pair of radiator patterns are individually formed on an outer circumferential surface of the substrate, the radiator patterns operating in different frequency bands;

an L-C circuit; and a coil coupled between the radiator and the L-C circuit, to attenuate noise introduced through the radiator.

18. A wireless terminal comprising:

an antenna device including:

a radiator configured to be extracted from/retracted into the wireless terminal;

an L-C lumped circuit; and a noise removing coil coupled between the radiator and the L-C lumped circuit, the noise removing coil and the lumped L-C circuit together forming a low pass or band pass filter to attenuate noise introduced through the radiator.

19. The wireless terminal of claim 18, wherein:

when the antenna device is fully extracted, the antenna device has a proximal end within the wireless terminal at which the noise removing coil is disposed, and a distal end at which a helical coil is disposed, the helical coil forming at least part of the radiator.

* * * * *